(No Model.)
J. S. GRABILL.
HORSE POWER FOR HAY CARRIERS.
No. 315,934. Patented Apr. 14, 1885.
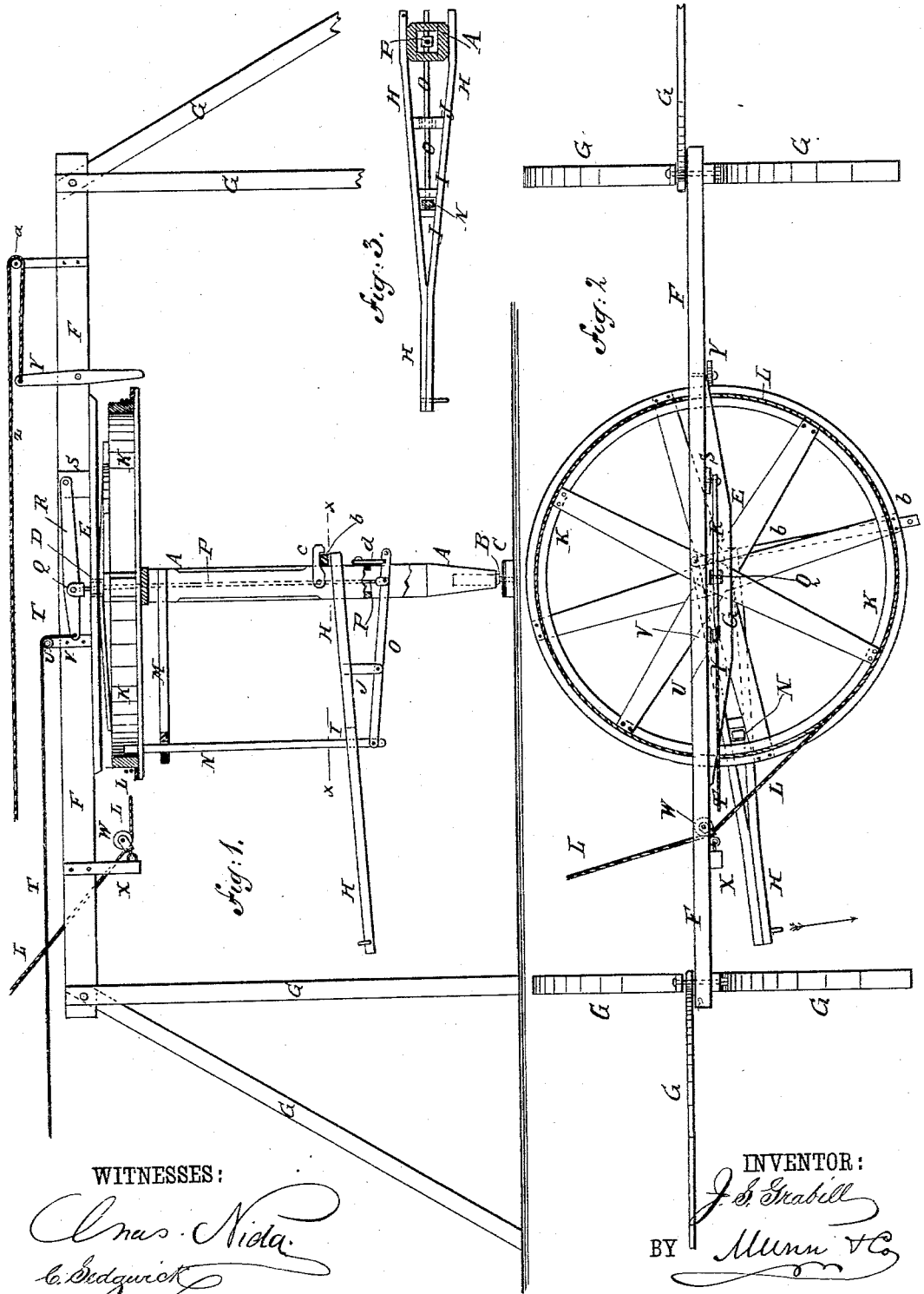
WITNESSES:
INVENTOR:
J. S. Grabill
BY Munn & Co.
ATTORNEYS.

United States Patent Office.

JOHN S. GRABILL, OF HAYESVILLE, OHIO.

HORSE-POWER FOR HAY-CARRIERS.

SPECIFICATION forming part of Letters Patent No. 315,934, dated April 14, 1885.

Application filed November 21, 1884. (No model.)

*To all whom it may concern:*

Be it known that I, JOHN S. GRABILL, of Hayesville, in the county of Ashland and State of Ohio, have invented a new and useful Improvement in Horse-Powers for Hay-Carriers and other Uses, of which the following is a full, clear, and exact description.

Reference is to be had to the accompanying drawings, forming part of this specification, in which similar letters of reference indicate corresponding parts in all the figures.

Figure 1 is a side elevation of one of my improved horse-powers, partly in section and parts being broken away. Fig. 2 is a plan view of the horse-power. Fig. 3 is a sectional plan view of a part of the same, taken through the line $x\,x$, Fig. 1.

The object of this invention is to improve the construction of the horse-powers for which Letters Patent No. 296,950 were issued April 15, 1884, in such a manner as to make them lighter, stronger, and more convenient in use.

The invention consists in the combination, with the loose wheel, the vertical shaft that carries the loose wheel, and the lock-bar and its lever that fasten the said loose wheel and shaft together, of a connecting-rod placed within the said vertical shaft and swiveled at its upper end to a lever operated by a cord passing around a guide-pulley, whereby the said wheel can be thrown into and out of gear with the said shaft from a point at a distance from the power.

The invention also consists in the combination, with the loose wheel, of a brake-lever and a cord attached to the said lever and passed around a guide-pulley, whereby the said brake-lever can be operated from a point at a distance from the power, as will be hereinafter fully described.

A represents a vertical shaft, which is made of plank spiked or bolted together, so as to be light and at the same time strong. Upon the lower end of the shaft A is formed, or to it is attached, a journal, B, which revolves in a socket-bearing, C, secured to the ground or to a barn-floor, as circumstances may require. Upon the upper end of the vertical shaft A is formed, or to it is attached, a tubular journal, D, which revolves in a bearing, E, attached to a beam, F.

When the machine is to be used for stacking hay or for other outdoor purposes, the beam F is supported by inclined posts G. When the machine is used for elevating hay and depositing it in a mow, the beam F may be a timber of the barn-frame, or may be attached to the said frame.

H is the sweep, to the outer end of which the horse is attached, and which is formed of planks connected by bolts. The forward parts of the planks forming the sweep H are parallel and in contact, and their rear parts incline from each other, and are kept at the desired distance apart by blocks I J, interposed between them, and through which the connecting-bolts pass. The rear ends of the planks forming the sweep H are bolted or otherwise secured to the opposite sides of the lower part of the vertical shaft A. Upon the upper journal of the vertical shaft A is placed a loose wheel, K, which is formed of hubs, spokes, and a rim, and has a flange at the lower edge of the said rim, to prevent the hoisting-rope L, coiled around the said rim, from slipping off.

To the shaft A, a little below the loose wheel K, is rigidly attached an arm, M, projecting to or nearly to the rim of the said wheel K. In the outer end of the arm M is formed a guide-hole, in which slides the upper part of the bar N. The lower part of the bar N passes through a guide-opening between the parts of the sweep H and the blocks I, and its lower end is hinged to the outer end of the lever O, which is fulcrumed to the downwardly-projecting end of the block J, which serves as a hanger. The inner end of the lever O passes through an opening in the vertical shaft A, and to it is attached the lower end of the rod P, which passes up through the interior of the said shaft A, and through the tubular journal D, and is swiveled at its upper end to the bend of a clevis, Q, attached to a lever, R. One end of the lever R is fulcrumed to a support, S, attached to the beam F, and to its other end is attached the end of a cord, T, which passes over a guide-pulley, U, pivoted to a standard, V, attached to the beam F and rising above the level of the lever R, so that the said end of the lever R will be raised by drawing upon the said cord T. From the pulley U the cord T is led to the wagon from which the hay is to be unloaded, so that it can be operated to control the horse-power by the operator that manages the hay-fork. The hoisting-rope L passes from the rim of the loose wheel K around the guide-pulley W, the block of which is swiveled to a hanger, X, attached to the beam F or some other suitable support. From the pulley W the hoisting-rope L is led to an ordinary hay-carrier, so that the said carrier will be operated from the horse-power. With this construction, when the fork of the hay-carrier has been loaded, the cord T is released or slackened, which allows the weight of the rod P to raise the bar N and cause its upper end to engage with a spoke of the loose wheel K, so that the shaft A in its revolution will carry the said wheel K with it to wind up the rope L and operate the hay-carrier. When the hay-carrier has reached the place for unloading, the fork is tripped in the ordinary manner, and at the same time the cord T is drawn upon, which withdraws the locking-bar N from the wheel K and allows the shaft A to continue its revolution without carrying the said wheel K with it. When the fork has been again loaded, the cord T is again slackened, throwing the wheel K into gear with the shaft A, and so on, as hereinbefore described, until the wagon is unloaded. The motion of the wheel K may be checked, when the said wheel is being turned back by the movement of the carrier from the place of unloading to the place of loading, by a brake-lever, Y, which operates against the rim or flange of the said wheel K, is pivoted to the beam F, and is operated by a cord, Z, attached to the upper end of the said lever, passed around a guide-pulley, a, secured to the beam F, and is led to the loaded wagon or some other place where it can be conveniently operated at the proper time.

With this construction no special driver will be required for the horse that operates the power, as the man that manages the hay-fork can keep him to his work.

b is the guide-bar, to the outer end of which the head of the horse is hitched. The inner end of the guide-bar b is hinged to the end of one part of the rear end of the sweep H, and the said guide-bar rests upon the rear end of the other part of the said sweep, and is thus supported in a horizontal position, and is secured in place by a hook, c, pivoted to the vertical shaft A.

The bar N can be locked in place, when withdrawn from the wheel K, by a hook, d, pivoted to the vertical shaft A, and which engages with the projecting rear end of the lever O.

Having thus described my invention, what I claim as new, and desire to secure by Letters Patent, is—

1. The combination, with the loose wheel K, the vertical shaft A, the lock-bar N, and the lever O, of the interior swiveled rod, P, the lever R, and the cord T and guide-pulley U, substantially as herein shown and described, whereby the said wheel can be thrown into and out of gear with the said shaft from a point at a distance from the power, as set forth.

2. The combination, with the loose wheel K, of the brake-lever Y, and the cord Z and guide-pulley a, substantially as herein shown and described, whereby the said brake-lever can be operated from a point at a distance from the power, as set forth.

JOHN S. GRABILL.

Witnesses:
H. A. SLOANE,
W. W. ARMSTRONG.